Feb. 14, 1928.
F. B. KNISKERN
1,658,926
SELECTIVE OVERLOAD TRIP RELAY
Filed Sept. 23, 1924
2 Sheets-Sheet 2
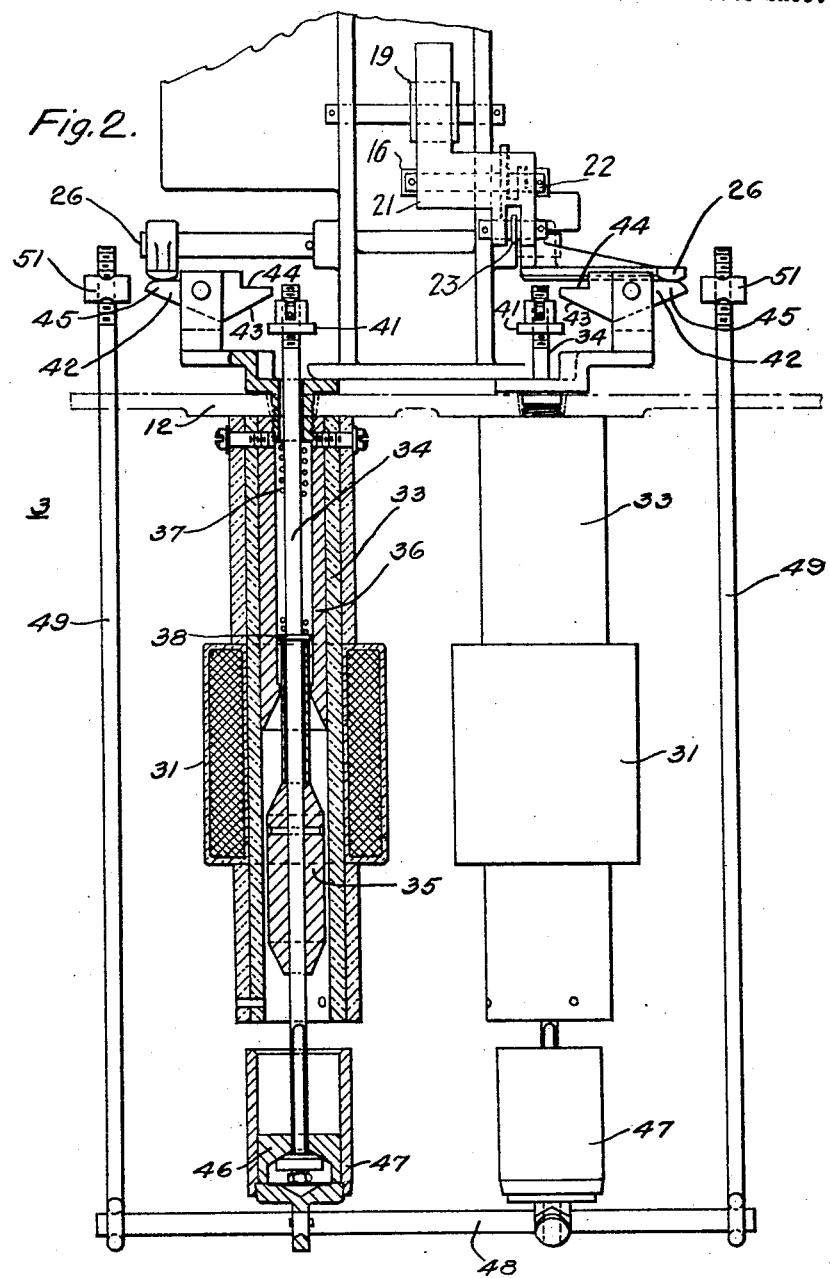
WITNESSES:
INVENTOR
Floyd B. Kniskern.
BY
ATTORNEY Patented Feb. 14, 1928.

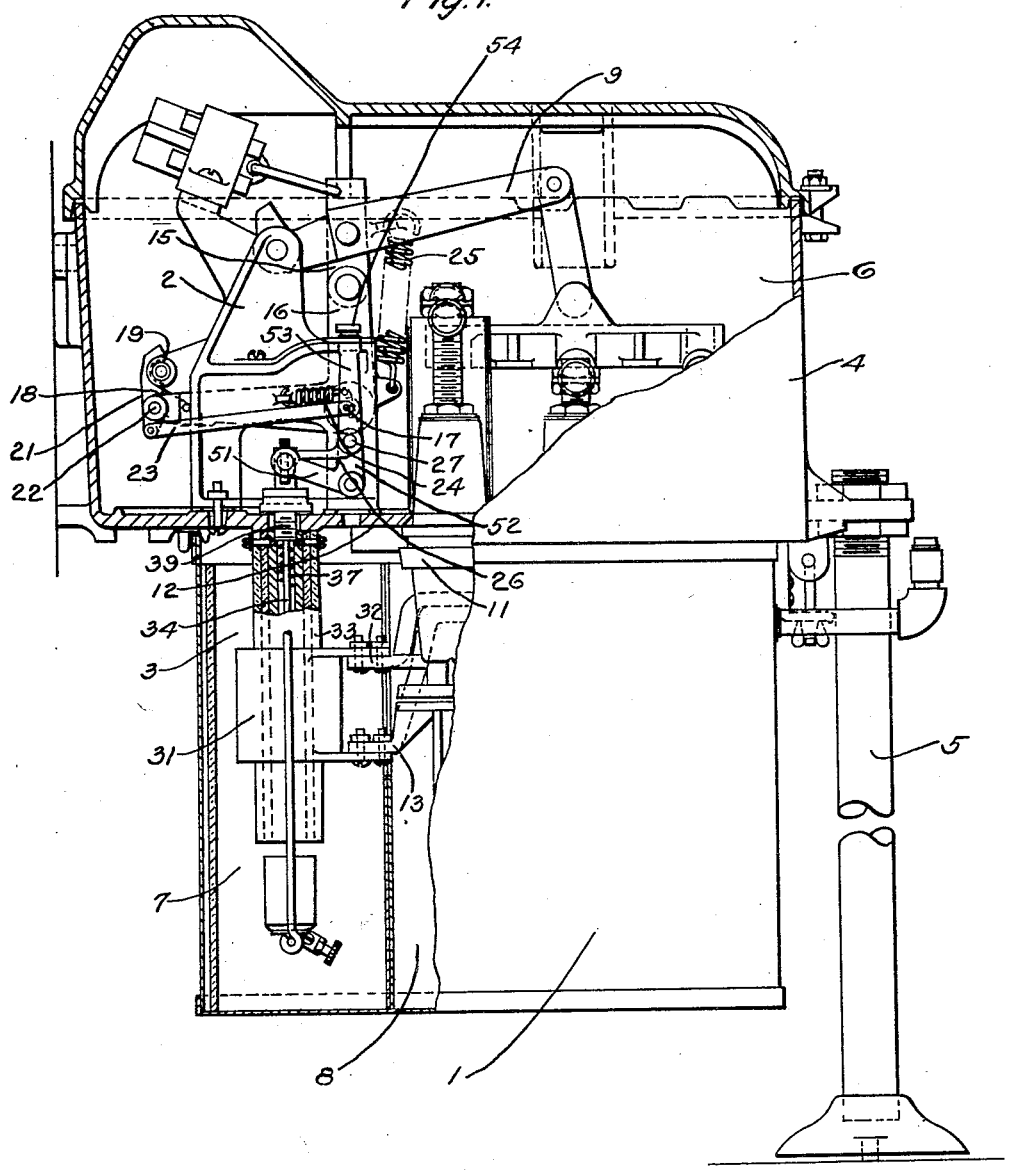

1,658,926

UNITED STATES PATENT OFFICE.

FLOYD B. KNISKERN, OF WILKINSBURG, PENNSYLVANIA, ASSIGNOR TO WESTING-HOUSE ELECTRIC & MANUFACTURING COMPANY, A CORPORATION OF PENNSYLVANIA.

SELECTIVE OVERLOAD TRIP RELAY.

Application filed September 23, 1924. Serial No. 739,271.

My invention relates to circuit interrupters and particularly to over-load tripping relays therefor.

One object of my invention is to provide a tripping relay for a circuit interrupter that shall actuate the associated circuit interrupter only upon the occurrence of a substantial current failure after the occurrence of a condition of sustained over-load.

Another object of my invention is to provide a circuit interrupter with a tripping relay that shall permit the circuit interrupter to remain in a closed position during the continuance of conditions of over-load, but that shall operate the circuit interrupter immediately upon the cessation of such overload conditions.

Another object of my invention is to provide an over-load tripping relay having the characteristics heretofore outlined.

In certain distribution systems the several feeder circuits are provided with circuit interrupters and the entire system is provided with a main circuit interrupter. Each of the feeder circuit interrupters is provided with an overload tripping relay that permits the affected circuit interrupter to remain in its closed position during the continuance of over-load conditions. However, upon the interruption of the entire system by reason of the operation of the main circuit interrupter, the tripping relay actuates the affected feeder circuit interrupter to its open position, thereby disconnecting the faulty feeder circuit from the system. The present invention relates to the mechanical and electrical details of the tripping relay for the feeder circuit interrupter.

In the accompanying drawings,

Figure 1 is a view, partially in elevation and partially in section, of a circuit interrupter equipped with my invention.

Fig. 2 is a view, partially in elevation and partially in section, of the tripping relays associated with the circuit interrupter shown in Fig. 1.

My invention comprises in general, a circuit interrupter 1 of any suitable type having a link mechanism 2 for controlling the movement of the customary movable members (not shown) and a relay mechanism 3 for controlling the link mechanism 2. The circuit interrupter 1 is provided with a housing 4, that is secured to a supporting frame work 5. Within the housing 4, the circuit interrupter 1 is divided into three primary compartments 6, 7 and 8 for housing the link mechanism 2, the tripping relay 3 and the contact members of the circuit interrupter, respectively. The contact members of the circuit interrupter 1 may be of any preferred type, the movable element of which is controlled from a lever 9, mounted in the compartment 6 and constituting an element of the link mechanism 2. Insulating bushings 11 extend through the partition 12, separating the compartment 6 from the compartments 7 and 8 for the purpose of conducting current to electrical terminals 13, within the compartment 8, and to the contact members (not shown) of the circuit interrupter.

Lever 9 is actuated by a toggle mechanism consisting of levers 15 and 16. Lever 16 is pivoted at axis 17 and has an arm 18 extending at right angles to the lever 16, thereby constituting a bell crank.

A stud 19 is mounted on the frame work of the circuit interrupter 1 and is engaged by a latch 21 that is pivotally mounted at 22 on arm 18 and is controlled by a link 23. A spring 24 is connected between the frames of the circuit interrupter 1 and the arm 18 for holding latch 21 in engagement with the stud 19. A spring 25 is connected between the frame and the lever 9 for accelerating the opening of the circuit interrupter 1.

Link 23 is controlled by a bell crank 26, that is pivotally mounted at 27. The point of attachment of the link 23 and the bell crank 26 is in alignment with the axis 17 of the arm 18. Bell crank 26 is connected to the tripping relay 3.

Referring to Fig. 2, each of the units of the tripping relay 3 comprises a coil 31 that is connected between the terminals 13 and 32 shown in Fig. 1. The coil 31 may be connected in series or parallel circuit between the bushing 11 and the contact members of the circuit interrupter 1 as desired. Within the coil 31 there is a frame 33 of suitable non-magnetic material within which a plunger 34 of magnetic material operates as an armature. The plunger 34 extends a considerable distance above and below the coil 31 and is provided with an enlarged portion 35 in proximity to the coil 31.

Frame 33 is provided at its upper end with a stationary core or bushing 36 that terminates within the coil 31. Bushing 36, therefore, acts as a limiting stop for upward movement of the plunger 34. A coil spring 37 is disposed about the plunger 34 between a collar 38 thereon and a bushing 39 mounted in the partition 12, whereby upward movement of the plunger 34 compresses the spring 37.

The upper end of the plunger 34 is provided with an adjustable collar 41 that engages a pivoted cam member 42. During upward movement of the plunger 34, the collar 41 engages a face 43 of the cam 42 and during downward movement, it engages a notch 44. The cam 42 is also provided with a projection 45 that is on the arm opposite to the surfaces 43 and 44 for engagement with the bell crank 26.

The lower end of the plunger 34 is provided with a piston 46 for cooperation with a cylinder 47, thereby constituting a retarding dash-pot for the plunger 34. The cylinders 47 are supported on a cross-bar 48 that in turn is supported by staybolts 49 that extend upwardly through partition 12 into threaded engagement with arms 51 of bell cranks 52.

Referring to Fig. 1, the other arms 53 of the bell crank 52 extend upwardly into compartment 6 and terminate in clamping screws 54 whereby the position of the cross-bar 48 may be varied from the compartment 6. The adjustment of the position of the arms 53 is communicated through the bell cranks 52 to the cross-bar 48 and the positions of the cylinder 47 are varied with respect to the frame 33 thereby varying the amount of travel of the enlarged portion 35 of the plunger 34 when the latter is drawn into engagement with the bushing 36. The variation in the length of the air gap defined by the movement of the enlarged portion 35 permits the ready adjustment of all the units of the tripping relay 3 for different current values in the circuit interrupter 1.

Upon the occurrence of excessive current in any coil 31, its plunger 34 is drawn upwardly against the action of the retarding element and the compressive force of the spring 37. During upward movement, the collar 41 engages the face 43 of the cam 42 and rotates the latter in a counter-clockwise direction, thereby allowing collar 41 to pass by the cam 42. So long as current of excessive magnitude continues to traverse the coil 31, the plunger 34 remains in its upper position.

Upon the occurrence of a material reduction in the amount of current traversing the coil 31, such as might be occasioned by the opening of another circuit interrupter between the controlled interrupter and the source of electromotive force, the coil 31 is de-energized permitting the spring 37 to expand against the collar 38 thereby forcing the plunger 34 downwardly. The collar 41 thereupon engages the notch 44 in cam 42 causing the latter to turn in clockwise direction. During the turning movement of the cam 42, the projection 45 raises the arm 26 thereby rotating the latter about the pivot point 27 which operation imparts a longitudinal movement of link 23 to the right, as viewed in Fig. 1. The movement of the link 23 causes the latch 21 to turn about its pivot point 22 whereupon it is released from the stud 19. Upon the release of the stud 19 by the latch 21, arm 18 is turned in a counterclockwise direction about the pivot point 17 by reason of the collapse of the toggle 15—16 under the tension of spring 25. The lever 9 is moved by the spring 25 and the force of gravity acting on the contact members of the circuit interrupter 1 for interrupting the circuit.

The feeder circuit with which the circuit interrupter 1 is associated is thereupon separated from the main distribution system. The circuit interrupter 1 preferably embodies three units for interrupting the three conductors of a three-phase circuit, although the number of units employed may be varied in accordance with the particular circuit to which it is connected. It is sufficient to provide such a circuit interrupter with one less tripping unit than the number of circuit interrupting units for complete overload protection.

After the faults on the disconnected feeder circuit have been cared for, the link mechanism 2 may be again moved to its circuit closing position by any suitable means (not shown). During the circuit closing operation the latch 21 is again brought into engagement with the stud 19 and is held in such position by the force of spring 24 which tends to move the lever 23 in a left-hand direction.

In a distributing system equipped with my invention, a short circuit on any feeder causes the associated tripping relay to become energized but not to operate the circuit interrupter until the current traversing the same has fallen to a predetermined amount after the occurrences of the overload, whereupon the feeder circuit is disconnected from the main transmission system.

It is to be understood that various changes in the arrangement of apparatus and circuits shown in the accompanying drawing may be made within the scope of the appended claims.

I claim as my invention:

1. In a circuit interrupter, a tripping mechanism comprising a latch, a lever for operating the latch, and means comprising a member stressed during excessive current conditions in the circuit interrupter, for actuating the lever when the current traversing the circuit interrupter is materially reduced.

2. In a circuit interrupter, a tipping mechanism comprising a latch, and means for operating the latch comprising a member stressed during excessive current conditions in the circuit interrupter and released when the current traversing the circuit interrupter is materially reduced.

3. In a circuit interrupter, a tripping mechanism comprising a latch, means comprising a spring stressed during excessive current conditions in the circuit interrupter, and released when the current traversing the circuit interrupter is materially reduced to operate the latch.

4. In a circuit interrupter, a tripping mechanism comprising a latch, means comprising a spring and an electromagnet for stressing the spring during conditions of excessive current in the circuit interrupter, the spring being released when the current traversing the circuit interrupter is materially reduced for actuating the latch.

5. In a circuit interrupter, a tripping mechanism comprising a latch, means for operating the latch comprising a spring, a solenoid, and an armature therefor, the armature stressing the spring during conditions of excessive current in the circuit interrupter, the stored energy in the spring being liberated when the current traversing the circuit interrupter is materially reduced, thereby abruptly returning the armature to its initial position.

6. In a circuit interrupter, a tripping mechanism comprising a latch, means for operating the latch comprising a cam, a spring, a solenoid, and an armature therefor having an engaging surface, the armature member stressing the spring and the engaging surface thereof passing by the cam during conditions of excessive current in the circuit interrupter, the stored energy in the spring being liberated when the current traversing the circuit interrupter is materially reduced, thereby abruptly returning the armature to its initial position and causing the circuit interrupter to be actuated by the return engagement of the armature member with the cam.

7. In combination, a plurality of electromagnets, supporting means therefor, retarding element for each of the electromagnets, common supporting means for the retarding elements and means for adjusting the relative positions of the supporting means.

8. In combination, a plurality of electromagnets, supporting means therefor, a retarding element for each of the electromagnets and an adjustable frame for supporting the several retarding elements from each supporting means.

9. In combination, a plurality of electromagnets for connection to different conductors of an electrical circuit, a common supporting means for the electromagnets, a retarding means for each of the electromagnets, a common supporting means for all the retarding means, and means for controlling the relative positions of the several supporting means.

10. In combination, a plurality of electromagnets for connection to different conductors of an electrical circuit, a common supporting means for the electromagnets, a retarding means for each of the electromagnets, a common supporting means for all the retarding means, and means for varying the operating value of the electromagnets by varying the relative positions of the several supporting means.

11. In combination, a plurality of coils for connection to different conductors of an electrical circuit, an armature for each of the coils, common supporting means for the coils, a retarding element for each armature, common supporting means for the retarding means, an adjustable connecting means between the supporting means whereby the relative positions of the coils and retarding means may be varied in accordance with the current traversing the coils.

12. In combination, a plurality of coils for connection to different conductors of an electrical circuit, a plunger for each of the coils, common supporting means for the coils, a retarding dash pot for each plunger, common supporting means for the dash pots, and adjustable connecting means between the supporting means whereby the relative positions of the coils and dash-pots may be varied in accordance with the current traversing the coils.

In testimony whereof, I have hereunto subscribed my name this 17th day of September, 1924.

FLOYD B. KNISKERN.